Oct. 15, 1968 R. E. SPIES 3,406,249

COLOR KILLER PHASE DETECTOR FOR COLOR TELEVISION RECEIVERS

Filed Oct. 13, 1965

Inventor
ROLF E. SPIES
BY
Mueller, Aichele & Rauner
ATTYS.

3,406,249
COLOR KILLER PHASE DETECTOR FOR COLOR TELEVISION RECEIVERS

Rolf E. Spies, Lyons, Ill., assignor to Motorola, Inc., Franklin Park, Ill., a corporation of Illinois Filed Oct. 13, 1965, Ser. No. 495,433
7 Claims. (Cl. 178—5.4)

ABSTRACT OF THE DISCLOSURE

A color killer phase detector circuit for a color TV receiver is formed by ading a third diode in circuit with one of the two diodes of the reference oscillator phase detector. The two diodes together with the circuitry coupled thereto form a balanced bridge circuit which develops an output signal when a color signal is received.

Figures 1, 2:
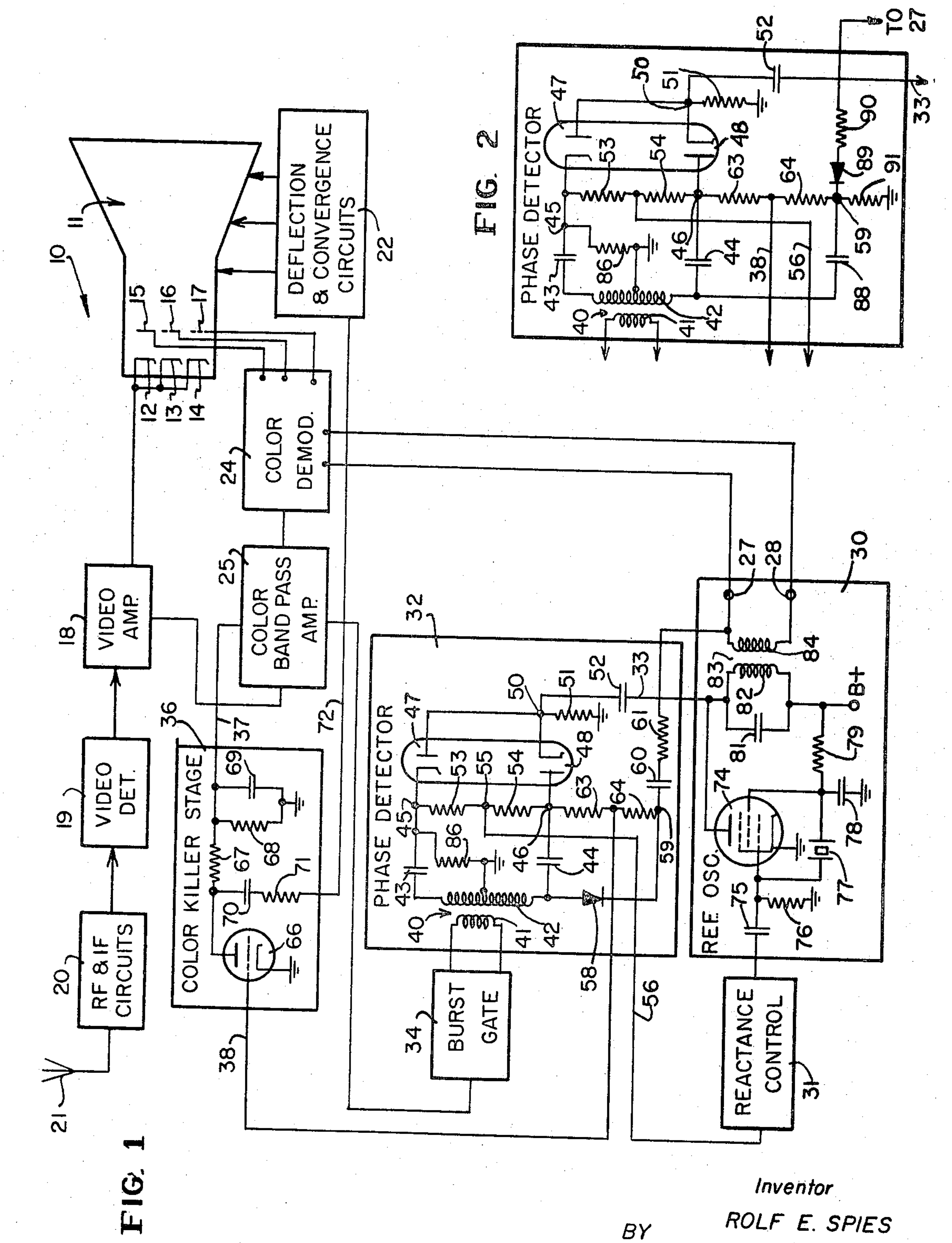

The phase detector circuit of this invention has other applications but is particularly advantageous in color television receivers, in which color killer circuits are required for disabling the color channels of the receiver during reception of monochrome signals, in order to prevent the application of noise signals from the color channels to the picture tube. To disable the color channel, it is the usual practice to apply a negative voltage in the grid circuit of a color channel amplifier tube from the plate circuit of a color killer tube, with a negative voltage being applied to the grid of the color killer tube when a color burst signal is received. To detect the presence of the burst signal, balanced phase detector circuits have been provided using a transformer for applying signals to two diodes operated as peak detectors, with a reference signal derived from the color oscillator being applied thereto, and with a maximum negative voltage being developed when the burst signal is received in phase with the reference signal. Such circuits have performed very well but have been high in cost, in requiring a transformer and two diodes, usually two vacuum diodes in a common envelope.

Circuits have heretofore been proposed combining the color killer phase detector with a phase detector required for controlling the color reference oscillator. With such proposed circuits, three diodes are connected in a manner such as to operate as two balanced detectors, thereby reducing by one the number of diodes required in comparison with conventional circuits. However, in such three diode circuits as heretofore proposed, a color killer control signal is developed in the form of a balanced control voltage which indicates whether the burst and reference signals are out of or in synchronism, the control voltage being at a maximum when the signals are in synchronism and at a minimum when the signals are in 90° phase relation. To obtain such a control voltage which indicates whether the burst and reference signals are out of or in synchronism, such circuits have required complex and expensive phase-shifting circuitry substantially nullifying the advantage of the reduction in the number of diodes, and careful adjustment would be required to obtain the stability and noise-immunity capabilities of the conventional circuits.

This invention was evolved with the general object of overcoming the disadvantages of prior circuits and with the specific object of providing a circut which is inexpensive and yet stable and reliable in operation, and insensitive to noise and variations in operating conditions.

According to this invention, a phase detector circuit is provided which can compare burst and reference signals to develop a signal for control of a reference ocsillator, and which can develop the required color killer control signal, using only three diodes and using simple and inexpensive phase-shifting circuitry, while being highly stable and reliable and insensitive to noise.

In accordance with important features of the invention, voltages in response to one signal, preferably the burst signal, are applied in 180° phase relation to first and second detectors to both of which another voltage is applied, preferably from the reference oscillator, and a third detector is provided which responds to both signals, with the first and second detectors being operative to develop a first output signal having a magnitude and polarity corresponding to the amount and direction of deviation of the phase of the input signal relative to a certain phase of the reference signal, and with the second and third detectors being operative to develop a second output signal having a substantial magnitude when the input signal is in the aforesaid certain phase relation to the reference signal.

In accordance with a specific feature of the invention, the second output signal having a substantial magnitude when the signals are in the desired phase relation is developed reliably by providing a phase shift between signals applied to the first and second detectors in relation to the signals applied to the second and third phase detectors, substantially greater than zero and substantially less than 180°. Preferably, the phase shift may be on the order of 90°, which is readily and inexpensively accomplished by use of a simple resistance-capacitance phase shift network.

In accordance with another specific feature of the invention, the voltages in 180° phase relation are developed by means of a transformer having a center-tapped secondary winding.

Further features of the invention relate to the use of peak detectors, preferably including diodes and capacitors connected in series, and to the provision of simple and inexpensive matrix circuitry for combining the outputs of such detectors to develop the required output signals.

An additional feature of the invention relates to the use of matched circuit arrangements such that both of the output voltages are substantially unaffected by variations in the amplitudes of the input and reference signals.

In accordance with a further specific feature of the invention, a pair of vacuum diodes, preferably in a common envelope, are used in the first and second detectors, while a silicon or other solid state diode is used as the third detector.

This invention contemplates other and more specific objects, features and advantages which will become more fully apparent from the following detailed description taken in conjunction with the accompanying drawing, which illustrates preferred embodiments and in which:

FIGURE 1 is a combined block and schematic diagram of a color television receiver using a phase detector circuit according to the invention; and FIGURE 2 is a circuit diagram, showing the modification of the phase detector circuit shown in FIGURE 1.

Reference numeral 10 generally designates a color television receiver incorporating a color killer and burst reference control circuit according to the invention. The illustrated receiver comprises a color kinescope 11 which may preferably be a shadow mask type of tube having three guns including cathodes 12, 13 and 14 and control grids 15, 16 and 17. The cathodes 12–14 are connected together into an output of a video amplifier circuit 18 having an input coupled to an output of a video detector circuit 19. The input of the video detector circuit 19 is connected to an output of RF and IF circuits 20 coupled to an antenna 21.

Deflection, power supply and convergence circuits 22 are provided for effecting scanning of the screen of the kinescope 11 by the beams from the electron guns, for supplying operating voltages to the color kinescope 11 and other circuits, and for obtaining proper convergence of the beams at all points of the screen.

The control grids 15–17 are connected to outputs of a color demodulator circuit 24 to which color information signals are applied from a color band pass amplifier 25, the color band pass amplifier 25 having an input connected to an output of the video amplifier circuit 18.

For demodulation of the color information signal applied from the color band pass amplifier 25, the color demodulator 24 has input terminals connected to output terminals 27 and 28 of a reference oscillator 30. The reference oscillator 30 must be synchronized with a color burst signal component of a received signal and for this purpose, the phase of operation of the reference oscillator 30 is controlled by a reactance control circuit 31 which responds to an output signal from a phase detector circuit 32 constructed in accordance with the invention, phase detector circuit 32 being responsive to a reference signal from the oscillator 30, applied on a line 33, and also being responsive to a burst signal applied from a burst gate circuit 34 having an input connected to the color band pass amplifier 25.

It is highly desirable that the color band pass amplifier 25 be disabled during reception of monochrome signals, to prevent the application of noise signals from the color demodulator 24 to the picture tube 11. For this purpose, a color killer stage 36 is provided which during monochrome transmission is arranged to apply a negative voltage on a line 37 to the grid circuit of one stage of the color band pass amplifier 25, the negative voltage being removed during reception of a color signal having a burst component. An input of the color killer stage 36 is connected through a line 38 to an output of the phase detector circuit 32 of this invention.

The phase detector circuit 32 comprises a transformer 40 having a primary winding 41 connected to output terminals of the burst gate circuit 34 and having a secondary winding 42 with a center tap connected to ground. The ends of the secondary winding 42 are connected through capacitors 43 and 44 to circuit points 45 and 46 which are connected through diodes 47 and 48 to a circuit point 50 which is connected through a resistor 51 to ground and to a capacitor 52 to the line 33, connected to an output of the reference oscillator 30. Circuit points 45 and 46 are connected through resistors 53 and 54 to a circuit point 55 which is connected through a line 56 to the input of the reactance control circuit 31.

In the operation of the circuit as thus far described, the diodes 47 and 48 operate in conjunction with the capacitors 43 and 44 as peak detectors to develop output voltages at the circuit points 45 and 46. Such output voltages are of opposite polarity, the diodes 47 and 48 being oppositely poled with the cathode of the diode 47 and the anode of the diode 48 being respectively connected to the circuit points 45 and 46, and with the anode of diode 47 and the cathode of diode 48 connected together and to the circuit point 50. With respect to a reference signal applied at circuit point 50, or with respect to noise signals developed in the secondary winding 42, the voltages developed at the circuit points 45 and 46 are of equal magnitude and with the resistors 53 and 54 being of equal value, no output voltage is developed at the circuit point 55. However, when a color burst signal is applied, a resultant output voltage may be developed at the circuit point 55, depending upon its phase relation to the reference signal at circuit point 50. If the color burst signal at the upper end of the secondary winding 42 is exactly in phase with the signal at circuit point 50, the effective voltage at the circuit point 45 will be at a minimum positive level, while the voltage at the circuit point 46 will be at a maximum negative value, thereby developing a maximum negative voltage at circuit point 55. Similarly, with the signal at the upper end of secondary winding 42 being exactly out of phase with the signal at circuit 50, a maximum positive voltage will be developed at the output circuit point 55. With a 90° phase relation between such signals, however, no net output voltage will be developed at the circuit point 55.

The circuit is normally operated in the 90° phase shift region and for this purpose, the values of the resistors 51 and the capacitor 52 are such as to provide approximately a 90° phase shift of the signal applied on line 33 from the reference oscillator 30. Accordingly, when the burst signal is in phase with the signal on line 33, the voltage at the circuit point 55 is approximately zero and thus no signal is applied to the reactance control 31. However, if the phase of the burst signal relative to the reference signal on line 33 should shift in one direction or the other, a voltage is developed at the circuit point 55 having a magnitude and polarity corresponding to the amount and direction of deviation of the relative phase, and a corrective signal is applied to the reactance control 31 to cause the reference oscillator 30 to shift its phase, so as to bring the reference signal on line 33 into phase with the burst signal.

To develop the color killer control signal, a third peak detector circuit is provided, including a silicon diode 58 connected between the lower end of the winding 42 and a circuit point 59, and a capacitor 60 connected in series with a resistor 61 between circuit point 59 and output terminal 27 of the reference oscillator 30. With this arrangement, a voltage of positive polarity is developed at the circuit point 59 of a magnitude dependent upon the phase relation of the signal at the lower end of the winding 42 and the signal at the terminal 27.

A pair of resistors 63 and 64 of equal value are connected between the line 38 and the circuit points 46 and 59, to develop an output voltage corresponding to the difference between the voltages at circuit points 46 and 59.

In operation, when the burst signal is in phase with the signal from the reference oscillator applied from terminal 27, at which time the burst signal is in 90° phase relation to the signal at circuit point 50, there is a substantial difference between the voltages at circuit points 46 and 59 to develop a negative output voltage at the output line 38, of sufficient magnitude as to operate the color killer stage 36. The development of such an output voltage is insured by providing a substantial phase difference, substantially greater than zero and substantially less than 180°, between the signal at circuit point 50 and the signal at terminal 27. Preferably, the 90° phase relation is used, because it is readily obtained through the simple and inexpensive resistance-capacitance network 51, 52 of the illustrated circuit.

In the illustrated color killer stage, a triode 66 is used having a grid connected to the line 38, a cathode connected to ground and a plate connected through a resistor 67 to the line 37, line 37 being connected through a resistor 68 and a capacitor 69 to ground. The plate of the triode 66 is connected through a capacitor 70 and a resistor 71 to a line 72 to which a flyback pulse is applied from the circuit 22. When the signals are in the above described phase relation to develop the negative voltage at the line 38, conduction of the triode 66 is minimized to produce a less negative voltage at the line 37. However, when the output voltage is not developed at the line 38, the triode 66 conducts heavily, to produce a more negative voltage at the line 37.

The illustrated reference oscillator 30 comprises a pentode 74 having a control grid connected through a capacitor 75 to the output of the reactance control circuit 31, through a resistor 76 to ground, and to one terminal of a crystal 77 the other terminal of which is connected to the screen grid of the pentode 74. The screen grid is additionally connected through a bypass capacitor 78 to ground and through a resistor 79 to a power supply terminal 80. The plate of the pentode 74 is connected to the line 33 and to the terminal 80 through a tank circuit comprising a capacitor 81 and a primary winding 82 of a transformer 83 having a secondary winding 84 connected to the terminals 27 and 28.

An important feature of the circuitry is that noise immunity and balance are readily accomplished under all conditions of operation. To do so, equal burst signal and/or noise amplitudes are maintained for the diodes 48 and 58, which is readily accomplished since both diodes obtain their signals from the same transformers. It is also important that the time constant of the loops including diodes 48 and 58 be equal, which can be readily obtained by using a value for capacitor 60 substantially smaller than that of the capacitor 44.

The use of the silicon diode 58 is advantageous, but such diodes generally have a higher perveance than vacuum diodes and the resistor 61 serves to match the two diode characteristics. In some cases, the efficiency of the silicon diode may be less than the vacuum diode, which is readily compensated for by using a slightly higher reference carrier amplitude for the silicon diode circuit.

The addition of the killer circuit components in the phase detector results in a slight unbalance of the color phase detector, and a resistor 86 may be provided to restore balance and symmetry of the circuit.

FIGURE 2 shows a modification which permits the use of equal coupling capacitors, a capacitor 88 being connected between the lower end of the secondary winding 42 and the circuit point 59, with a diode 89 and a resistor 90 connected betwen circuit point 59 and the reference oscillator. In this circuit, an additional resistor 91 is connected between circuit point 59 and ground in order to equalize the time constant of diodes 48 and 89.

Referring to FIG. 1 it can be seen that the phase detector of this invention, used to energize the color killer stage, is in the form of a balanced bridge. The bridge terminals are as follows; the junction of the plate of tube 74, capacitor 81 and secondary winding 82; the lower end of secondary winding 42, circuit point 46 and circuit point 59.

By way of illustrative example and not by way of limitation, the key components may have values according to the following table, wherein the values of resistors are in ohms, with "K" indicating thousands of ohms, "M" indicating megohms, and wherein "pf." indicates picofarads:

| Reference numeral: | | Component value |
|---|---|---|
| 43 | pf. | 330 |
| 44 | pf. | 330 |
| 60 | pf. | 82 |
| 61 | | 1.5K |
| 63 | | 2.2M |
| 64 | | 2.2M |
| 88 | pf. | 330 |
| 90 | | 560 |
| 90 | | 820K |

It will be understood that modifications and variations may be effected without departing from the spirit and scope of the novel concepts of this invention.

I claim as my invention:

1. In a phase detector for responding to input and reference signals, first circuit means having a first output terminal and a first bridge terminal, said first circuit means being responsive to one of said input and reference signals to apply said one signal to said first output terminal and said first bridge terminal with a 180° phase relationship therebetween, a second bridge terminal adapted to receive the other of said input and reference signals, a first detector coupled to said output terminal and said second bridge terminal, a second detector coupled to said first bridge terminal and having a third bridge terminal, second circuit means couplng said second detector to said second bridge terminal, third circuit means coupled to said first and second detectors and operative to develop a first output signal having a magnitude and polarity corresponding to the amount and direction of deviation of the phase of said input signal relative to a certain phase of said reference signal, a third detector coupled to said first bridge terminal and having a fourth bridge terminal, fourth circuit means coupling said third detector to said second bridge terminal, said second and third detectors and said second and fourth circuit means forming a bridge circuit, and fifth circuit means connected to said third and fourth bridge terminals and operative to develop a second output signal having a substantial magnitude with said input signal in said certain phase relation to said reference signal.

2. The phase detector according to claim 1 wherein, at least one of said second and fourth circuit means includes phase shifting means whereby said other signal applied to said second detector is shifted 90° in phase relative to said other signal applied to said third detector.

3. The phase detector according to claim 2 wherein, said first circuit means includes a transformer having a primary winding adapted to receive said one signal and a center tapped secondary winding, one end of said secondary winding being coupled to said output terminal and the other end of said secondary winding being coupled to said first bridge terminal.

4. In a phase detector for a color television receiver for responding to input and reference signals, a transformer having a center-tapped secondary winding, first circuit means coupled to said transformer for applying one of said input and reference signals to said transformer, a first bridge circuit terminal, second circuit means coupled to said center tap and said first bridge circuit terminal for applying the other of said signals between said center tap and said first bridge circuit terminal, a first detector circuit including a first capacitor and a first diode connected in series and connected to one end of said secondary winding, a second bridge circuit terminal coupled to the other end of said secondary winding, a second detector circuit including a second capacitor and a second diode connected in series and connected to said second bridge circuit terminal, the circuit point between said second diode and said second capacitor forming a third bridge terminal, third circuit means coupling said first and second detector circuits to said first bridge circuit terminal, a first output terminal, a first resistor connected between said first output terminal and a circuit point between said first capacitor and said first diode, and a second resistor connected between said first output terminal and said third bridge terminal, said first and second diodes being oppositely poled to develop at said first output terminal a first output signal corresponding to the amount and direction of deviation of the phase of said input signal relative to a certain phase of said reference signal, a third detector circuit coupled to said second bridge terminal and having a third diode and a third capacitor connected in series with the circuit point between said third diode and said third capacitor forming a fourth bridge terminal, fourth circuit means coupling said third detector circuit to said first bridge terminal, at least one of said third and fourth circuit means including phase shifting means whereby said one signal applied to said second detector has a phase shift with respect to said one signal applied to said third detector substantially equal to 90°, said second and third detectors and said third and fourth circuit means forming a bridge circuit, a second output terminal, a third resistor connected between said second output terminal and said third bridge terminal, and a fourth resistor connected between said second output terminal and said fourth bridge terminal.

5. The phase detector of claim 4 wherein, the color television receiver includes a color demodulator, a reference oscillator for generating said reference signal and coupled to said color demodulator, a reactance control circuit coupled to said oscillator for controlling the frequency and phase of operation thereof, said second circuit means coupling said reference signal to said first bridge circuit terminal, said input signal being a burst signal, said first circuit means including a burst circuit coupled to said transformer for supplying said burst signal thereto, said reactance control circuit being coupled to said first output terminal and being responsive to the potential at said first output terminal to regulate the frequency and phase of said reference signal, means including a color killer circuit for applying color signals to said demodulator, said color killer circuit being coupled to said second output terminal and being responsive to the potential thereat to couple said color signals to said color demodulator with said burst signal present.

6. The phase detector of claim 5 wherein, said second capacitor is connected between said second and third bridge circuit terminals and said second diode is connected between said third bridge circuit terminal and said third circuit means, said third capacitor is connected between said fourth bridge circuit terminal and said fourth circuit means, and said third diode is connected between said second and fourth bridge circiut terminals.

7. The phase detector of claim 5 wherein, said second capacitor is connected between said second and third bridge circuit terminals and said second diode is connected between said third bridge circuit terminal and said third circuit means, said third capacitor is connected between said second and fourth bridge circuit terminals, and said third diode is connected between said fourth bridge circuit terminal and said fourth circuit means.

References Cited

UNITED STATES PATENTS 2,971,050 2/1961 Kelly et al. ---------- 178—5.4

ROBERT L. GRIFFIN, *Primary Examiner.*

RICHARD R. MURRAY, *Assistant Examiner.*